(12) United States Patent
Kaneko (10) Patent No.: US 10,418,882 B2
(45) Date of Patent: Sep. 17, 2019

(54) TRACTION MOTOR WITH COOLING FAN FOR IMPROVED COOLING FLOW (71) Applicant: MITSUBISHI ELECTRIC CORPORATION, Chiyoda-ku, Tokyo (JP)

(72) Inventor: Kenta Kaneko, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 58 days.

(21) Appl. No.: 15/109,517

(22) PCT Filed: Feb. 7, 2014

(86) PCT No.: PCT/JP2014/052911
§ 371 (c)(1),
(2) Date: Jul. 1, 2016

(87) PCT Pub. No.: WO2015/118660
PCT Pub. Date: Aug. 13, 2015

(65) Prior Publication Data
US 2016/0329778 A1 Nov. 10, 2016

(51) Int. Cl.
*H02K 9/06* (2006.01)
*H02K 9/02* (2006.01)
(Continued)

(52) U.S. Cl.
CPC .......... *H02K 9/06* (2013.01); *H02K 5/10* (2013.01); *H02K 9/00* (2013.01); *H02K 9/02* (2013.01);
(Continued)

(58) Field of Classification Search
CPC ............ H02K 9/06; H02K 9/00; H02K 9/005; H02K 9/02; H02K 9/04; H02K 9/08;
(Continued)

(56) References Cited

U.S. PATENT DOCUMENTS 5,214,325 A * 5/1993 Matson ............... H02K 9/06
310/58
6,426,580 B1 * 7/2002 Ikeda ................. H02K 1/243
310/257
(Continued)

FOREIGN PATENT DOCUMENTS

CN 102356534 A 2/2012
CN 102971945 A 3/2013
(Continued)

OTHER PUBLICATIONS

Extended European Search Report dated Aug. 11, 2017, issued by the European Patent Office in corresponding European Application No. 14881811.5. (9 pages).
(Continued)

*Primary Examiner* — Julio C. Gonzalez
*Assistant Examiner* — Alexander A Singh
(74) *Attorney, Agent, or Firm* — Buchanan Ingersoll & Rooney PC (57) ABSTRACT

A traction motor comprises a stator, a rotor core, an iron core holder, a cooling fan, a rotor, a frame, a bracket, and a bearing unit. The cooling fan includes a main plate that separates the inside and the outside of the totally-enclosed traction motor; blades provided on the bracket side of the cooling fan and along a rotational direction of the rotor; and a guide provided on the bracket side of the blades. In the bracket, inlets are provided within an area obtained when the guide is projected onto the bracket. The guide is formed such that air drawn in through the inlets is guided to a rotor shaft.

11 Claims, 5 Drawing Sheets

(51) Int. Cl.
*H02K 9/00* (2006.01)
*H02K 5/10* (2006.01)
*H02K 9/16* (2006.01)
*H02K 9/04* (2006.01)
*H02K 9/12* (2006.01)
*H02K 5/16* (2006.01)
*H02K 5/20* (2006.01)

(52) U.S. Cl.
CPC ............ *H02K 9/04* (2013.01); *H02K 9/12* (2013.01); *H02K 9/16* (2013.01); *H02K 5/16* (2013.01); *H02K 5/20* (2013.01)

(58) Field of Classification Search
CPC .. H02K 9/10; H02K 9/12; H02K 9/14; H02K 9/16; H02K 9/18; H02K 9/28; H02K 7/14; H02K 5/20; H02K 5/16; H02K 5/10; H02K 5/12
USPC .......... 310/52, 55, 57, 58, 60 R, 61, 62, 63, 310/60 A, 64
See application file for complete search history.

(56) References Cited

U.S. PATENT DOCUMENTS

| | | |
|---|---|---|
| 8,536,744 B2 | 9/2013 | Nagayama et al. |
| 9,013,077 B2 | 4/2015 | Maeda |
| 2004/0150270 A1* | 8/2004 | Nagayama ............ H02K 1/32 310/61 |
| 2012/0062057 A1 | 3/2012 | Nagayama et al. |
| 2013/0119796 A1* | 5/2013 | Maeda .................. H02K 9/06 310/63 |

FOREIGN PATENT DOCUMENTS

| | | | |
|---|---|---|---|
| JP | 53-81305 U | 7/1978 | |
| JP | 11-356005 | 12/1999 | |
| JP | 2004-187352 A | 7/2004 | |
| JP | 2005-333795 A | 12/2005 | |
| JP | 2008-220054 A | 9/2008 | |
| JP | 2010-098791 A | 4/2010 | |
| JP | 2010-220417 A | 9/2010 | |
| JP | WO 2012017528 A1 * | 2/2012 | ............ H02K 9/06 |
| JP | 2012-50172 A | 3/2012 | |

OTHER PUBLICATIONS

International Search Report (PCT/ISA/210) dated Apr. 22, 2014, by the Japanese Patent Office as the International Searching Authority for International Application No. PCT/JP2014/052911.
Written Opinion (PCT/ISA/237) dated Apr. 22, 2014, by the Japanese Patent Office as the International Searching Authority for International Application No. PCT/JP2014/052911.
Office Action dated Dec. 22, 2017 in corresponding Chinese Patent Application No. 201480074829.4, and a full machine English translation thereof.
Office Action (Communication pursuant to Article 94(3) EPC) dated Jul. 10, 2018, by the European Patent Office in corresponding European Patent Application No. 14881811.5. (8 pages).
Office Action dated Aug. 2, 2018, by the Chinese Patent Office in corresponding Chinese Patent Application No. 201480074829.4 and English translation of the Office Action. (13 pages).
Office Action dated Feb. 6, 2019, by the India Patent Office in corresponding India Patent Application No. 201647023747. (5 pages).

* cited by examiner

TRACTION MOTOR WITH COOLING FAN FOR IMPROVED COOLING FLOW

FIELD

The present invention relates to a totally-enclosed traction motor that drives a railroad vehicle.

BACKGROUND

In general, traction motors of a totally-sealed type (totally-enclosed traction motors) are commonly used in rotating electrical machines for driving railroad vehicles from the view point of reducing maintenance. This kind of totally-enclosed traction motor principally includes a tube-shaped frame, brackets that close opposite ends of the frame, a rotor shaft supported by bearings provided in the brackets, a rotor iron core provided on the rotor shaft, a stator iron core fixed to the frame, and a stator coil secured to the stator iron core, and is configured to hermetically seal the air inside the motor.

With a totally-enclosed traction motor having such a configuration, the structure is such that the inside is hermetically sealed; therefore, the motor cannot take in outside air for cooling, which means that a measure is needed to make the frame larger and thereby increase the radiation area or the like in order to radiate inner heat to the outside. To avoid the disadvantage of becoming larger, a totally-enclosed traction motor has been proposed that uses a cooling fan as a component that separates the inside and the outside of the motor. In this traction motor, when the rotor rotates, the cooling fan fixed to the rotor agitates the air inside (inner air); therefore the inner air heated by the rotor and the stator iron core exchange heat with the cooling fan, frame, and the like, and thus the traction motor is efficiently cooled.

To design a traction motor with even greater capacity, it is necessary to cool the internal air more effectively. To this end, measures such as increasing the volume of airflow generated by the cooling fan or mounting a cooling device on the traction motor is necessary. However, with these measures, new problems occurs in that, as the volume of airflow increases, noise also increases; and in that the traction motor becomes larger due to it having a cooling device mounted thereon.

A means of solving such problem in a conventional traction motor is presented in the Patent Literature 1 below, and it involves an opening being formed in a bracket and a ventilation passage extending from the opening to the vicinity of the rotor shaft being formed on the motor-inner side of this bracket. On the main plate of the cooling fan, a plurality of blades are formed on the side surface of the bracket, and outside air is taken in through the opening by the cooling fan rotating. The outside air, which is cooling air for cooling the traction motor, flows through the ventilation passage in the bracket, over the rotor shaft, and over the blades, in that order, and is expelled through a ventilation passage formed in the frame to the outside of the motor. Thus, the radiation from the entire traction motor becomes more efficient and thus downsizing of the traction motor is achieved.

CITATION LIST

Patent Literature

Patent Literature 1: Japanese Patent Application Laid-Open Publication No. 2010-220417 (FIG. 1)

SUMMARY

Technical Problem

In the conventional technology, the ventilation passage for guiding outside air to the vicinity of the rotor shaft is formed on the motor-inner side of the bracket. That is, there is a protrusion between the main plate and the bracket. Hence, the blades of the cooling fan need to be placed radially outward of the ventilation passage.

However, in general, as the blades of the cooling fan are located further radially outward, the circumferential velocity of the blade outer diameter portions increases; therefore, the blades cut through air at high speed, resulting in an increase in the noise from the cooling fan. With this structure of the above conventional technology, there is the problem in that, if the blade outer diameter is reduced in order to reduce the noise from the cooling fan, the blade area decreases and, therefore, the necessary volume of airflow cannot be ensured.

The present invention is made in view of the above, and an object of the present invention is to provide a totally-enclosed traction motor that ensures the necessary volume of cooling airflow while noise is suppressed, thereby improving the radiation efficiency.

Solution to Problem

In order to solve the above problems and achieve the object, an aspect of the present invention is a totally-enclosed traction motor including: a stator; a rotor including a rotor core placed on an inner circumference side of a stator and a cooling fan; a frame containing the stator and the rotor; a bracket connected to the frame and supporting a rotor shaft; and a bearing unit provided in the bracket to support the rotor shaft, wherein the cooling fan includes a main plate that increases in diameter from the iron core holder toward the bearing unit and that separates an inside and an outside of the totally-enclosed traction motor, a plurality of first blades provided on a bracket side of the cooling fan and along a rotational direction of a rotor, and a first guide placed on a bracket side of the first blades and parallel to the main plate, in the bracket, an inlet is provided within an area obtained when the first guide is projected onto the bracket, and the first guide is formed such that air drawn in through the inlet is guided to the rotor shaft.

Advantageous Effects of Invention

According to the present invention, because the circumferential velocity of the blade outer diameter portions is reduced without decreasing the blade area, an effect is obtained where the necessary volume of cooling airflow is ensured while noise is suppressed, thereby improving the radiation efficiency.

DESCRIPTION OF EMBODIMENTS

An embodiment of a totally-enclosed traction motor according to the present invention will be described in detail below with reference to the drawings. Note that this embodiment is not intended to limit the present invention.

Embodiment

Figure 1:
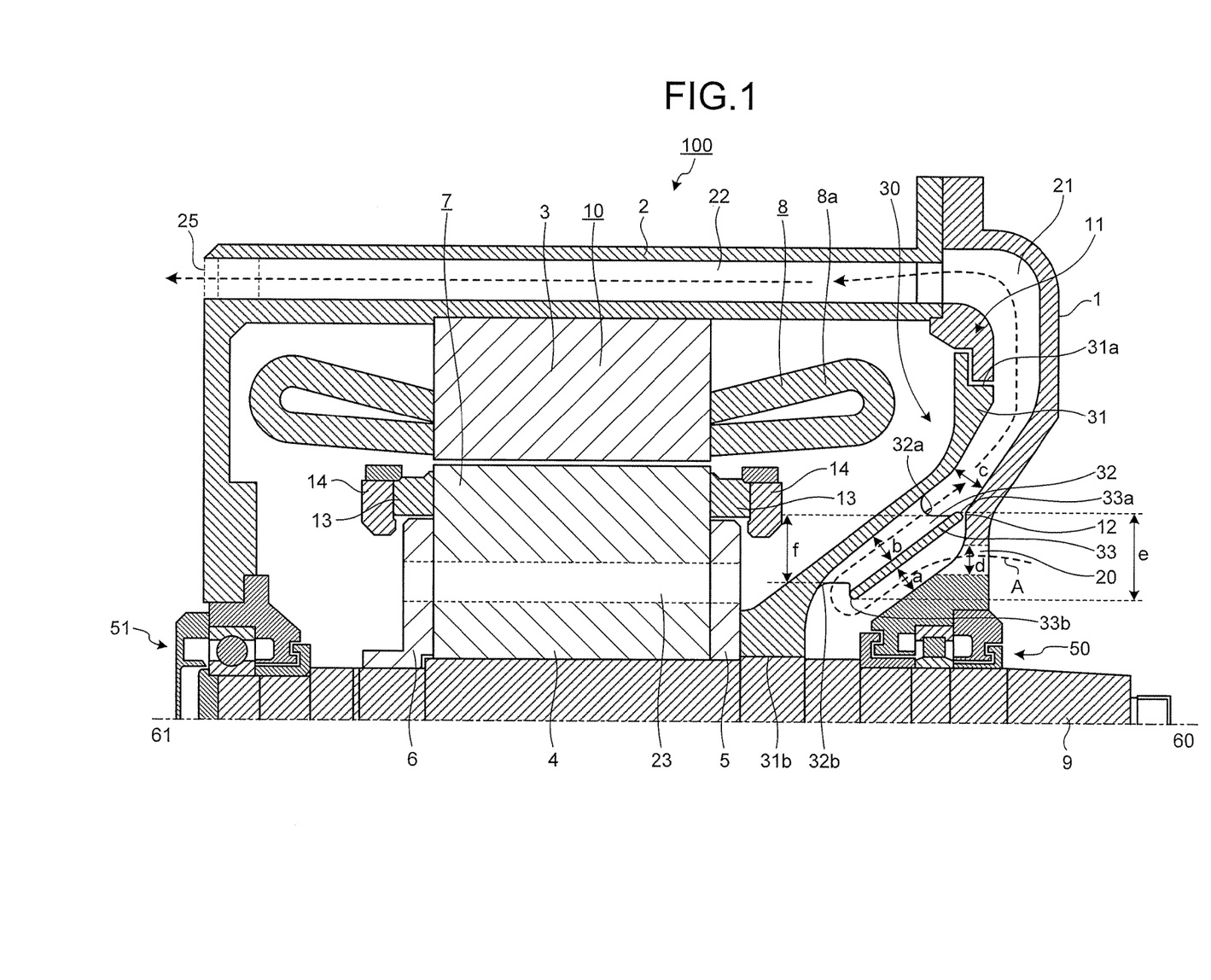
FIG. 1 is a longitudinal cross-sectional view of a totally-enclosed traction motor according to an embodiment of the present invention.
Figure 2:
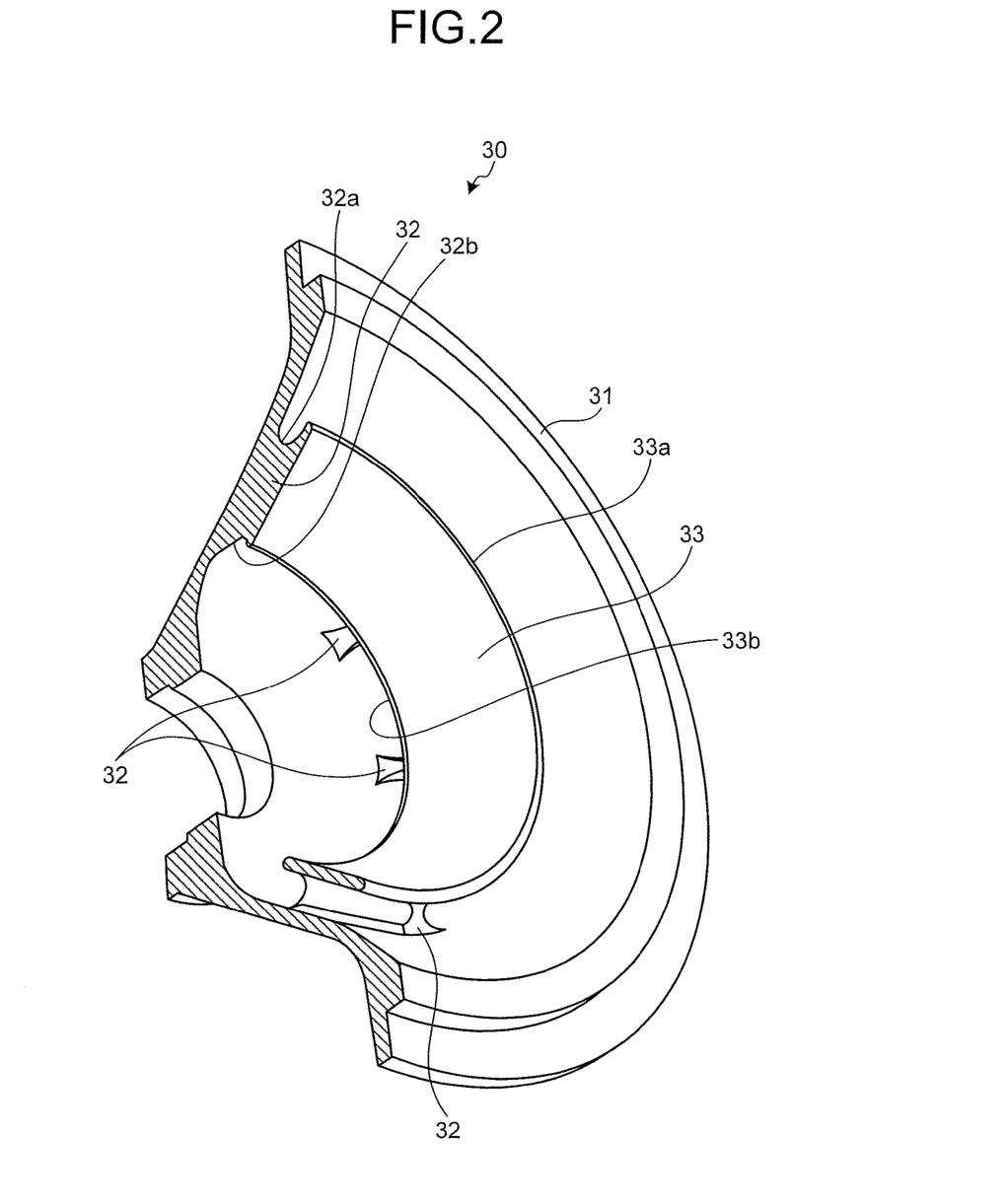
FIG. 2 is a perspective cross-sectional view of a cooling fan illustrated in FIG. 1.

FIG. 1 is a longitudinal cross-sectional view of a totally-enclosed traction motor according to an embodiment of the present invention. FIG. 2 is a perspective cross-sectional view of a cooling fan illustrated in FIG. 1.

A totally-enclosed traction motor (hereinafter called a "traction motor") 100 is configured to include a stator 10 constituted by a stator iron core 3 and a stator coil 8; a rotor 7 placed in the stator 10; a frame 2 containing the stator 10 and the rotor 7; a bracket 1 placed on a drive side 60 of the frame 2; and a cartridge 51 provided at the shaft center on a counter-drive side 61 of the frame 2.

In the bracket 1, ventilation passages 21 and inlets 20 are formed that are in communication with ventilation passages 22 of the frame 2. The inlets 20 are provided along a circumferential direction. The inlets 20 are provided within the area obtained when a guide 33 is projected onto the bracket 1.

In the frame 2, the ventilation passages 22 are formed that are located on the outer-periphery side of the stator iron core 3. A plurality of the ventilation passages 22 are provided along a circumferential direction of the frame 2 so as to be, at the ends on one side, in communication with the ventilation passages 21 of the bracket 1. At the ends on the other side of the ventilation passages 22, outlets 25 are formed through which cooling air having flowed through the ventilation passages 21 of the bracket 1 and the ventilation passages 22 of the frame 2 is discharged to the outside.

The rotor 7 comprises a rotor core 4 constituted by stacking electromagnetic steel sheets; an iron core holder 5 covering the drive side 60 of the rotor core 4; an iron core holder 6 covering the counter-drive side 61 of the rotor core 4; a cooling fan 30 secured to the iron core holder 5; rotor bars 13 embedded in the rotor core 4; and ring-shaped end rings 14 provided on the opposite ends of the rotor bars 13, which are integrally connected to form a squirrel-cage rotor for an induction motor.

A uniform gap is formed between the inner periphery surface of the stator iron core 3 and the outer periphery surface of the rotor core 4. A bearing unit 50 in the center of the bracket 1 houses a bearing to rotatably support one end of a rotor shaft 9 and has a labyrinth structure. The labyrinth forms the boundary between the rotating part and the stationary part and is a structure that prevents bearing lubricating grease from leaking out of the motor and that prevents external dust from entering the bearing and the inside of the motor from the outside. The cartridge 51 houses a bearing to rotatably support the other end of the rotor shaft 9 and has a labyrinth structure. With such a configuration, the rotational force of the rotor 7 is transmitted to a wheel via a joint and a gear (not illustrated) placed on the drive side 60.

The cooling fan 30 is constituted by a main plate 31; a plurality of blades 32 (first blades); and the guide 33 (a first guide). The main plate 31 has a shape that increases in diameter from the iron core holder 5 toward the bracket 1 and it is placed to separate the inside and the outside of the traction motor 100. The guide 33 will be described in detail later.

An outer periphery 31a of the main plate 31 is located near the bracket 1, and a labyrinth (minute gap 11) is provided between the main plate 31 and the bracket 1. By this means, entry into the motor of cooling air flowing between the cooling fan 30 and the bracket 1 is suppressed.

A through hole 31b to insert the rotor shaft 9 thereinto is made in the main plate 31, and the blades 32 are formed on the bracket 1 side surface (the drive side 60 surface in the figure) of the main plate 31. The blades 32 are provided along a circumferential direction of the rotor 7 and placed between the main plate 31 and the guide 33. The blade 32 is formed extending from the center of the cooling fan 30 toward the outer periphery 31a of the main plate, with an inner diameter side end 32b being located on the center side of the main plate 31 and an outer diameter side end 32a being located on the outer-periphery 31a side of the main plate 31.

The guide 33 is formed in, for example, a bottomless mortar shape and provided at the other ends of the blades 32 (on the drive side 60) so as to be opposite the inlets 20. The guide 33 is provided parallel to the main plate 31 so as not to hinder the flow of cooling air taken in through the inlets 20. The guide 33 illustrated in the figure is formed in such a way that the width e from its periphery (inner periphery 33b) on the main plate 31 side to its periphery (outer periphery 33a) on the bracket 1 side is greater than the width f from the inner diameter side end 32b to the outer diameter side end 32a.

The guide 33 is provided such that the inner periphery 33b is located near the place at which the main plate 31 and the rotor shaft 9 are fitted together and such that the outer periphery 33a is located near the bracket 1. By positioning the inner periphery 33b near the fitted-together place mentioned above, outside air introduced through the inlets 20 can be guided to the vicinity of the through hole 31b in the main plate 31; therefore, the heat exchange efficiency of the main plate 31 can be improved. Further, by positioning the outer periphery 33a near the bracket 1, outside air introduced through the inlets 20 can be prevented from passing through a minute gap 12 between the outer periphery 33a and the bracket 1 into the ventilation passages 21.

The effects of the guide 33 are as follows:

(1) Cooling air introduced from the outside is disturbed because the cross section of the air passage changes at the inlets 20. When this disturbed air goes between the main plate 31 and the guide 33, the inner diameter side end 32b transversely cuts through this disturbed air, thus amplifying the wind noise and causing noise. By providing the guide 33 in front of the inlets 20 as illustrated in the figure, outside air introduced through the inlets 20 is regulated before coming to the vicinity of the rotor shaft 9. Thus, the regulated air goes between the main plate 31 and the guide 33; therefore, the wind noise at the inner diameter side end 32b can be suppressed, thus reducing the noise.

(2) When air introduced through the inlets 20 passes the cooling fan, eddies of air occur because the blades 32 transversely cut through the air. By providing the guide 33 as illustrated in the figure, the eddies of air are suppressed; therefore, noise generated by the eddies can be reduced.

(3) Because the guide 33 exits between the blades 32 and the inlets 20, noise generated by the blades 32 is blocked by the guide 33; therefore, noise leaking out of the motor through the inlets 20 can be suppressed. Further, with the guide 33, a heat exchange is performed between heat inside the traction motor being absorbed by the main plate 31 and outside air at a low temperature, and thus the heat exchange efficiency of the main plate is improved; therefore, the cooling efficiency of the traction motor 100 is improved.

In the traction motor 100 illustrated in the figure, the cross section of the inlets 20 (indicated by d in the figure), the cross section of the air passages between the guide 33 and the bracket 1 (a in the figure), the cross section of the air passages between the main plate 31 and the guide 33 (b in the figure), and the cross section of the air passages between part of the main plate 31 on which the blades 32 are not provided and the bracket 1 (c in the figure) are formed such that they have the same size. With such a configuration, differences between the cross sections of the air passages a, b, c in the figure become small, and thus the disturbance of outside air introduced through the inlets 20 is suppressed; therefore, the wind noise generated by the outside air passing through these air passages can be suppressed.

The operation will be described below. By the cooling fan 30 rotating, outside air is taken in through the inlets 20. The outside air taken in through the inlets 20 flows between the guide 33 and the bracket 1 to the vicinity of the rotor shaft 9, then between the main plate 31 and the guide 33, between the main plate 31 and the bracket 1, through the ventilation passages 21, and through the ventilation passages 22, in that order, and is expelled through the outlets 25 to the outside, as indicated by the dotted line designated by a reference symbol A in FIG. 1. By this means, heat inside the traction motor 100 is expelled via the main plate 31, the frame 2, and the like to the outside. As a result, the entire traction motor 100 is efficiently cooled.

Figure 3:
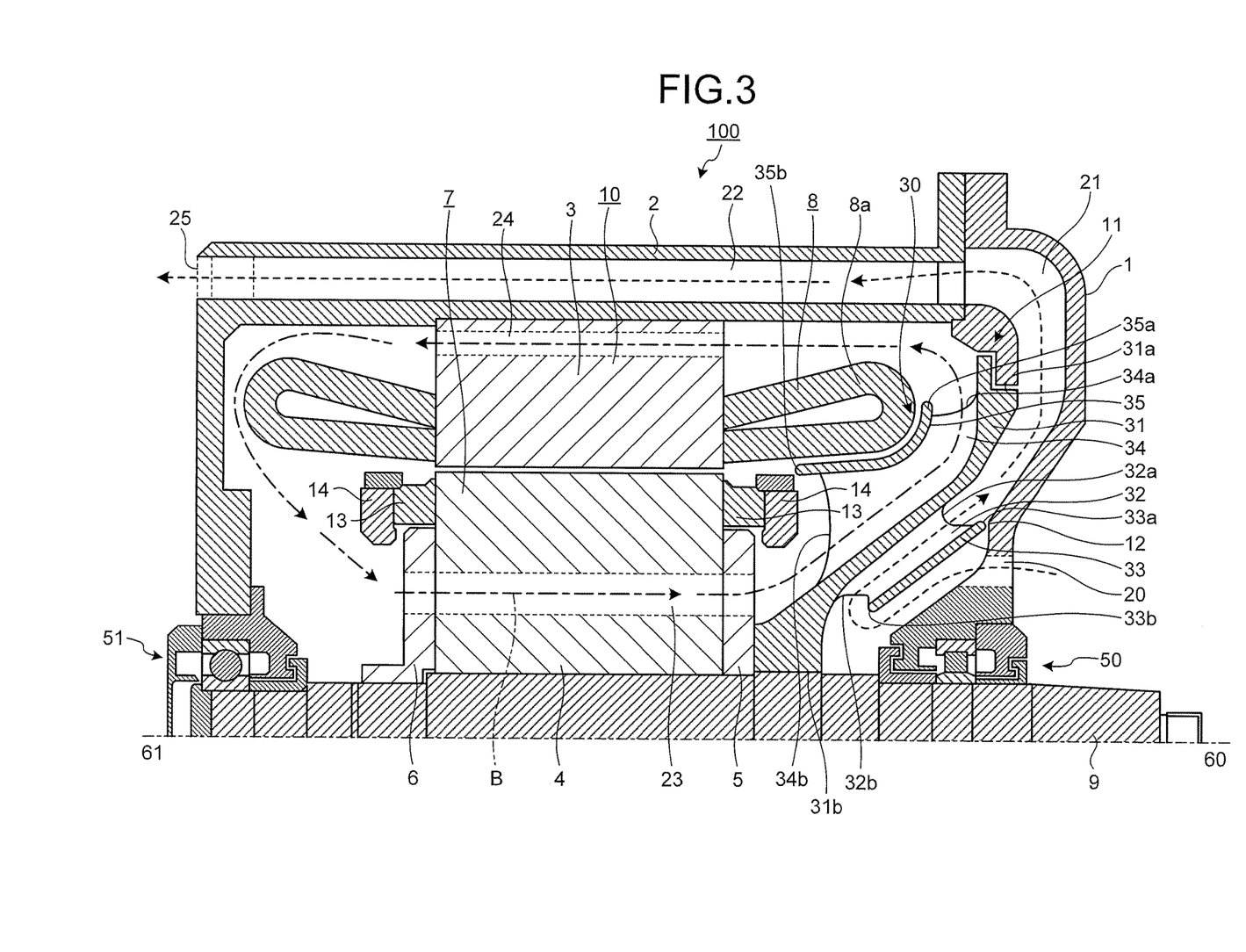
FIG. 3 is a diagram illustrating a modification of the cooling fan illustrated in FIG. 1.
Figure 4:
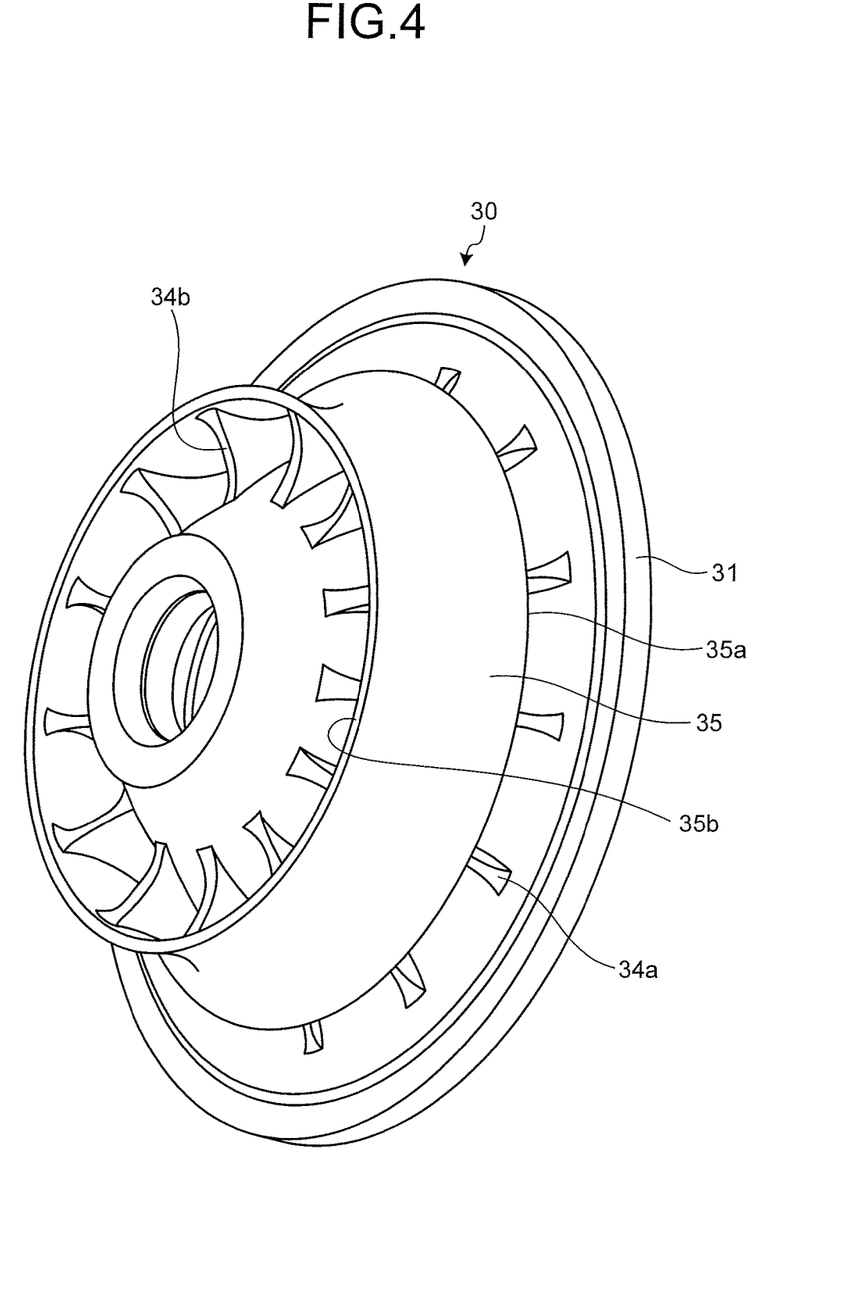
FIG. 4 is a perspective view of the cooling fan illustrated in FIG. 3.
Figure 5:
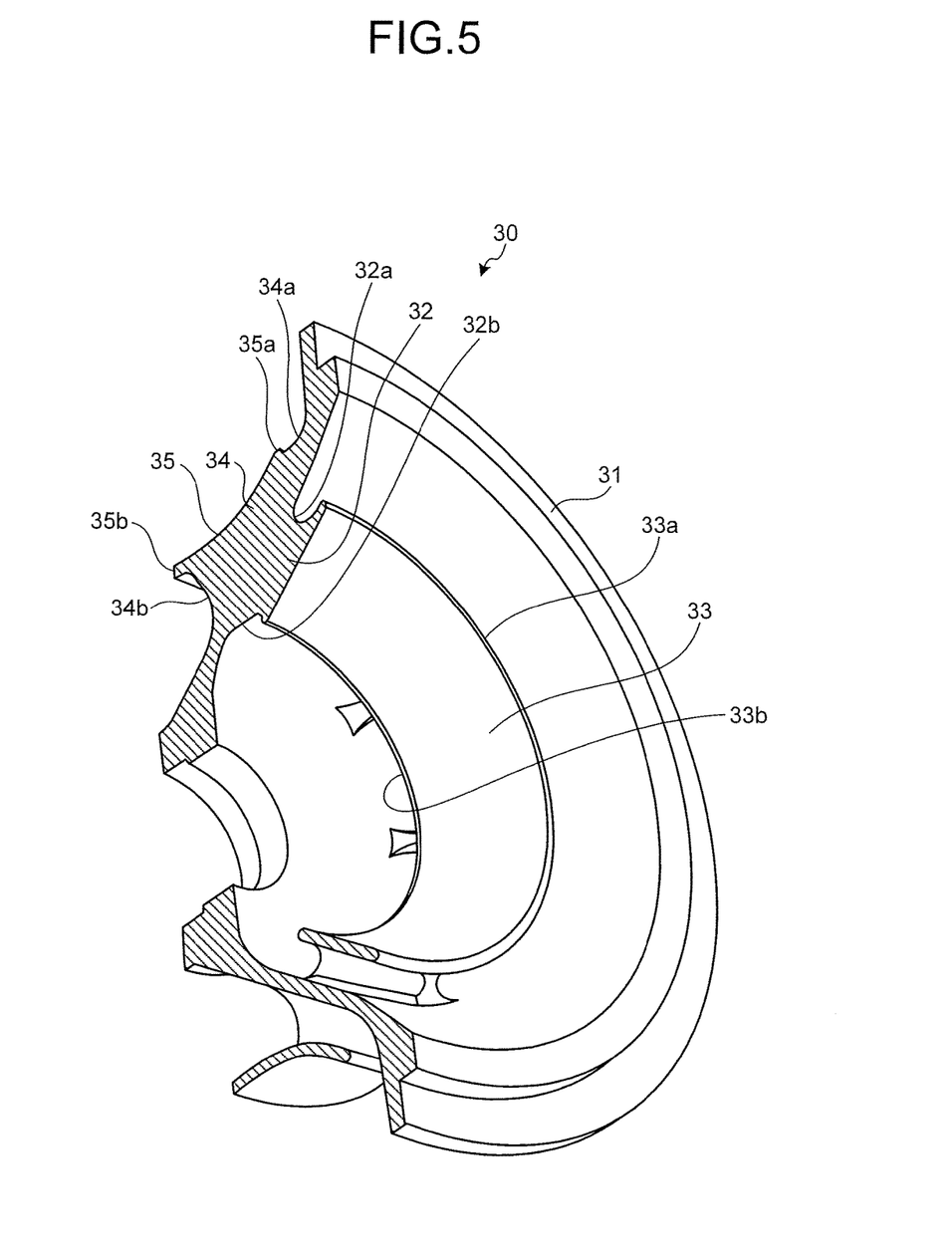
FIG. 5 is a perspective cross-sectional view of the cooling fan illustrated in FIG. 3.

Next, an example where the cooling fan 30 is modified will be described. FIG. 3 is a diagram illustrating a modification of the cooling fan illustrated in FIG. 1. FIG. 4 is a perspective view of the cooling fan illustrated in FIG. 3. FIG. 5 is a perspective cross-sectional view of the cooling fan illustrated in FIG. 3.

The cooling fan 30 illustrated in FIG. 3 includes the main plate 31, the blades 32, the guide 33, blades 34 (second blades), and a guide 35 (a second guide). The blades 34 are formed on the stator coil 8 side surface (the counter-drive side 61 surface) of the main plate 31. The blades 34 are provided along a circumferential direction of the rotor 7 and placed between the main plate 31 and the guide 35. The blade 34 is formed extending from the center of the cooling fan 30 toward the outer periphery 31a of the main plate.

An inner diameter side end 34b of the blade 34 is located on the end ring 14 side, and an outer diameter side end 34a is located on the outer-periphery 31a side of the main plate 31. It is desirable to provide the inner diameter side end 34b near the end ring 14 so that inner air having passed through ventilation passages 23 in the rotor core 4 is effectively guided to the main plate 31 side.

The guide 35 is formed in, for example, a bottomless mortar shape and provided in such a way that the periphery on the stator 10 side (inner periphery 35b) is located near the end of the rotor 7 with the periphery on the main plate 31 side (outer periphery 35a) being located near the outer periphery 31a of the main plate 31 so that air having passed through the gap between the inner periphery surface of the stator iron core 3 and the outer periphery surface of the rotor core 4 is guided to the outer periphery 31a of the main plate 31. The end of the rotor 7 is located, for example, between the end rings 14 and a coil end 8a. Although the position of the inner periphery 35b is not limited to the example illustrated in the figure, by providing the inner periphery 35b near the end of the rotor 7, inner air having passed through the ventilation passages 23 in the rotor 7 effectively passes over the surface of the main plate 31 without diffusing around the stator coil so as to be guided to ventilation passages 24 in the stator. Thus, the inner air circulation efficiency is increased to lower the temperature of the inner air; therefore, the cooling efficiency of the traction motor 100 is improved.

The operation will be described below. By the cooling fan 30 rotating, inner air is agitated so as to circulate inside the motor, passing through the ventilation passages 24 in the stator iron core 3 and the ventilation passages 23 in the rotor core 4, as indicated by a dotted line designated by a reference symbol B in FIG. 3. The inner air heated by the rotor 7, the stator iron core 3, and the like is taken from the inner periphery 35b side between the guide 35 and the main plate 31 and passes over the center to the periphery of the main plate 31 to be cooled through heat exchange with the main plate 31.

In the conventional technology, the ventilation passages for guiding outside air to the vicinity of the rotor shaft are formed on the inner-motor side of the bracket. That is, there is a protrusion between the main plate and the bracket. Hence, the inner diameter side end of the blade cannot be positioned radially inward of the ventilation passages. Thus, in order to ensure the necessary volume of airflow, the blade area needs to be increased by positioning the outer diameter side end of the blade near the outer periphery of the cooling fan. However, as the outer diameter side end of the blade is positioned further radially outward, the circumferential velocity of the outer diameter side of the blade increases, and the increase in circumferential velocity causes noise from the cooling fan to increase. As such, with this structure of the above conventional technology, there is the problem in that noise from the cooling fan cannot be reduced while ensuring enough blade area.

In the traction motor 100 according to the present embodiment, the outer diameter of the guide 33 and the blade 32 can be reduced without reducing the blade area. Thus, the circumferential velocity of the blade outer edge is reduced while maintaining the necessary volume of cooling airflow; therefore, noise can be reduced without reducing the cooling efficiency of the traction motor 100. Further, with the traction motor 100, the shape of the bracket is simplified, and thus manufacturing costs can be reduced.

Although the guide 35 is provided for the main plate 31 illustrated in the figure as an example, the configuration of the main plate 31 is not limited to the example of the figure, and the guide 35 may be omitted. In this case, the flow rate of inner air passing over the main plate 31 is reduced, but the heat exchange efficiency can still be increased when compared with the case of not having the blades 34.

In the traction motor 100 illustrated in the figure, the inlets 20 are provided in the bracket 1 on the drive side 60, and the blades 32, the guide 33, the blades 34, and the guide 35 are provided in the cooling fan 30 on the drive side 60, but the configuration of the traction motor 100 is not limited to the example of the figure. For example, the traction motor 100 may be configured such that through holes, corresponding to the inlets 20, are provided in the counter-drive side 61 surface of the frame 2 and that a cooling fan, like the cooling fan 30, is provided on the iron core holder 6, or that a mechanism, corresponding to the blades 34 and the guide 35, is provided on the drive side 60 surface of this cooling fan.

The position of the inner periphery 35b of the guide 35 illustrated in the figure is not limited to the example of the figure. For example, the guide 35 may have the inner periphery 35b positioned near the end of the rotor 7 and be formed in a shape similar to the shape of the coil end 8a. For example, in the case where the guide 35 is formed along and parallel to the coil end 8a, heat from the coil end 8a is absorbed by the guide 35; therefore, the stator iron core 3 and the coil end 8a can be effectively cooled.

As described above, the traction motor 100 according to the embodiment comprises the stator 10; the rotor 7 including the rotor core 4 placed on the inner circumference side of the stator 10 and the cooling fan 30; the frame 2 containing the stator 10 and the rotor 7; the bracket 1 connected to the frame 2 and supporting the rotor shaft 9; and the bearing unit 50 provided in the bracket 1 to support the rotor shaft 9. The cooling fan 30 includes the main plate 31 that increases in diameter from the iron core holder 5 toward the bearing unit and that separates the inside and the outside of the traction motor 100; the blades 32 (the first blades) provided on the bracket 1 side of the cooling fan 30 and along a rotational direction of the rotor 7; and the guide 33 (the first guide) placed on the bracket 1 side of the blade 32 and parallel to the main plate 31. In the bracket 1, the inlets 20 are provided within the area obtained when the guide 33 is projected onto the bracket 1, and the guide 33 is formed such that air drawn in through the inlets 20 is guided to the rotor shaft 9. With this configuration, the outer diameter of the guide 33 and the blade 32 can be reduced without decreasing the blade area. Thus, the circumferential velocity of the blade outer edge can be reduced while maintaining the necessary volume of cooling airflow; therefore, noise can be reduced without reducing the cooling efficiency of the traction motor 100. Further, with the traction motor 100, the shape of the bracket 1 is simplified, and thus manufacturing costs can be reduced.

Further, because the guide 33 is formed such that air having passed over the blades 32 does not return to the inlets 20, outside air introduced through the inlets 20 can be prevented from passing through the minute gap 12 between the outer periphery 33a and the bracket 1 into the ventilation passages 21. Further, because the inner periphery 33b of the guide 33 is formed such that air drawn in through the inlets 20 is guided to the rotor shaft 9, outside air introduced through the inlets 20 can be guided to the vicinity of the through hole 31b in the main plate 31; therefore, the heat exchange efficiency of the main plate 31 can be improved.

The totally-enclosed traction motor according to the embodiment is intended to present one example of the content of the present invention and it is implicit that it can be combined with other publicly known technology or that changes such as partial omission can be made thereto without departing from the spirit of the invention.

INDUSTRIAL APPLICABILITY

As described above, the present invention can be applied to totally-enclosed traction motors and is particularly useful as an invention that can improve the radiation efficiency by ensuring the necessary volume of cooling airflow while suppressing noise.

REFERENCE SIGNS LIST 1 bracket, 2 frame, 3 stator iron core, 4 rotor core, 5, 6 iron core holder, 7 rotor, 8 stator coil, 8a coil end, 9 rotor shaft, 10 stator, 11, 12 minute gap, 13 rotor bar, 14 end ring, 20 inlet, 21, 22, 23, 24 ventilation passage, 25 outlet, 30 cooling fan, 31 main plate, 31a outer periphery, 31b through hole, 32 blade, 32a outer diameter side end, 32b inner diameter side end, 33 guide, 33a outer periphery, 33b inner periphery, 34 blade, 34a outer diameter side end, 34b inner diameter side end, 35 guide, 35a outer periphery, 35b inner periphery, 50 bearing unit, 51 cartridge, 60 drive side, 61 counter-drive side, 100 totally-enclosed traction motor.

The invention claimed is:

1. A totally-enclosed traction motor comprising:
a stator;
a rotor including a rotor core placed on an inner circumference side of the stator, a cooling fan, and an iron core holder covering opposite ends of the rotor core;
a frame containing the stator and the rotor;
a bracket connected to the frame and supporting a rotor shaft; and
a bearing unit provided in the bracket to support the rotor shaft, wherein
the cooling fan includes
a main plate that increases in diameter from the iron core holder toward the bearing unit and that separates an inside and an outside of the totally-enclosed traction motor,
a plurality of first blades provided on a bracket side of the cooling fan and along a rotational direction of the rotor, and
a first guide placed on the bracket side of the first blades and parallel to the main plate,
an inlet provided in the bracket within an area obtained when first and second opposite longitudinal ends of the first guide are projected in parallel in an axial direction of the rotor onto the bracket,
the inlet provided in the bracket within an area obtained when an inner diameter side end of the blade and an outer diameter side end of the blade are projected in parallel in the axial direction of the rotor onto the bracket, and
the first guide is arranged opposite to and facing the inlet and is formed such that air drawn in through the inlet is guided to the rotor shaft.

2. The totally-enclosed traction motor according to claim 1, wherein the first guide is formed such that air having passed over the first blades does not return to the inlet.

3. The totally-enclosed traction motor according to claim 1, wherein an inner periphery of the first guide is formed such that air drawn in through the inlet is guided to the rotor shaft.

4. The totally-enclosed traction motor according to claim 1, wherein a cross section of the inlet, a cross section of an air passage between the first guide and the bracket, a cross section of an air passage between the main plate and the first guide, and a cross section of an air passage between part of the main plate on which the first blades are not provided and the bracket are all formed to have a same size.

5. The totally-enclosed traction motor according to claim 1, further comprising a plurality of second blades for inner air circulation on a stator side of the cooling fan and along a rotational direction of the rotor.

6. The totally-enclosed traction motor according to claim 5, further comprising a second guide formed along and parallel to a coil end of the stator on the stator side of the second blades.

7. The totally-enclosed traction motor according to claim 6, wherein the second guide is formed such that an inner periphery of the second guide is positioned near an end of the rotor.

8. The totally-enclosed traction motor according to claim 1, wherein
a width (e) of the first guide from an innermost periphery on a main plate side to an outermost periphery on a bracket side is greater than a width (f) of the blade from the inner diameter side end to the outer diameter side end.

9. The totally-enclosed traction motor according to claim 8, wherein
the width (e) is greater than a width (d) of the inlet in a direction perpendicular to a rotational axis of the rotor.

10. The totally enclosed traction motor according to claim 1, wherein an outermost periphery of the first guide on a bracket side is configured to have a gap to the bracket within a size to prevent the passage of air through the gap between the outermost periphery of the first guide and the bracket.

11. A totally-enclosed traction motor comprising:
a stator;
a rotor including a rotor core placed on an inner circumference side of the stator, a cooling fan, and an iron core holder covering opposite ends of the rotor core;
a frame containing the stator and the rotor;
a bracket connected to the frame and supporting a rotor shaft; and
a bearing unit provided in the bracket to support the rotor shaft, wherein
the cooling fan includes
a main plate that increases in diameter from the iron core holder toward the bearing unit and that separates an inside and an outside of the totally-enclosed traction motor,
a plurality of first blades provided on a bracket side of the cooling fan and along a rotational direction of the rotor, and
a first guide placed on the bracket side of the first blades and parallel to the main plate,
an inlet provided in the bracket within an area obtained when the first guide is projected onto the bracket, and
the first guide is formed such that air drawn in through the inlet is guided to the rotor shaft, wherein a cross section of the inlet, a cross section of an air passage between the first guide and the bracket, a cross section of an air passage between the main plate and the first guide, and a cross section of an air passage between part of the main plate on which the first blades are not provided and the bracket are all formed to have a same size.

* * * * *